(12) United States Patent
Shinohara et al.

(10) Patent No.: US 8,905,805 B2
(45) Date of Patent: Dec. 9, 2014

(54) METHOD OF MANUFACTURING NEAR-FIELD LIGHT GENERATING ELEMENT AND NEAR-FIELD LIGHT GENERATING ELEMENT

(75) Inventors: Yoko Shinohara, Chiba (JP); Norio Chiba, Chiba (JP); Manabu Oumi, Chiba (JP); Masakazu Hirata, Chiba (JP); Sachiko Tanabe, Chiba (JP); Yoshikazu Tanaka, Chiba (JP)

(73) Assignee: Seiko Instruments Inc. (JP)

( * ) Notice: Subject to any disclaimer, the term of this patent is extended or adjusted under 35 U.S.C. 154(b) by 473 days.

(21) Appl. No.: 13/369,488

(22) Filed: Feb. 9, 2012

(65) Prior Publication Data
US 2012/0206032 A1  Aug. 16, 2012

(30) Foreign Application Priority Data

Feb. 14, 2011  (JP) .................................. 2011-029126

(51) Int. Cl.
*H01J 9/00* (2006.01)
*G11B 5/48* (2006.01)
*G11B 5/00* (2006.01)

(52) U.S. Cl.
CPC ...... *G11B 5/4866* (2013.01); *G11B 2005/0021* (2013.01)

USPC .......................................... 445/1; 369/112.16

(58) Field of Classification Search
CPC .......... G11B 5/65; G11B 5/746; G11B 5/855; G11B 5/4866; G11B 5/314; G11B 2005/0021; G11B 7/1387; G11B 7/22; H05S 3/08
USPC ........................ 445/1; 313/110; 427/162, 127; 369/112.16
See application file for complete search history.

(56) References Cited

U.S. PATENT DOCUMENTS

2009/0168220 A1 *  7/2009  Komura et al. ................. 360/59

FOREIGN PATENT DOCUMENTS

JP  2007128573  5/2007
JP  2007280572  10/2007

* cited by examiner

*Primary Examiner* — Andrew Coughlin
(74) *Attorney, Agent, or Firm* — Adams & Wilks

(57) ABSTRACT

A U-shaped groove and a V-shaped groove are formed onto a cladding disposed on a substrate, a core and a metal structure are formed inside the grooves, respectively, and then the substrate surface is planarized. Further, after a cladding is formed again, the substrate is cut and the cut surface is polished such that the metal structure inside the V-shaped groove has a predetermined thickness, thereby forming a scattering body.

8 Claims, 8 Drawing Sheets

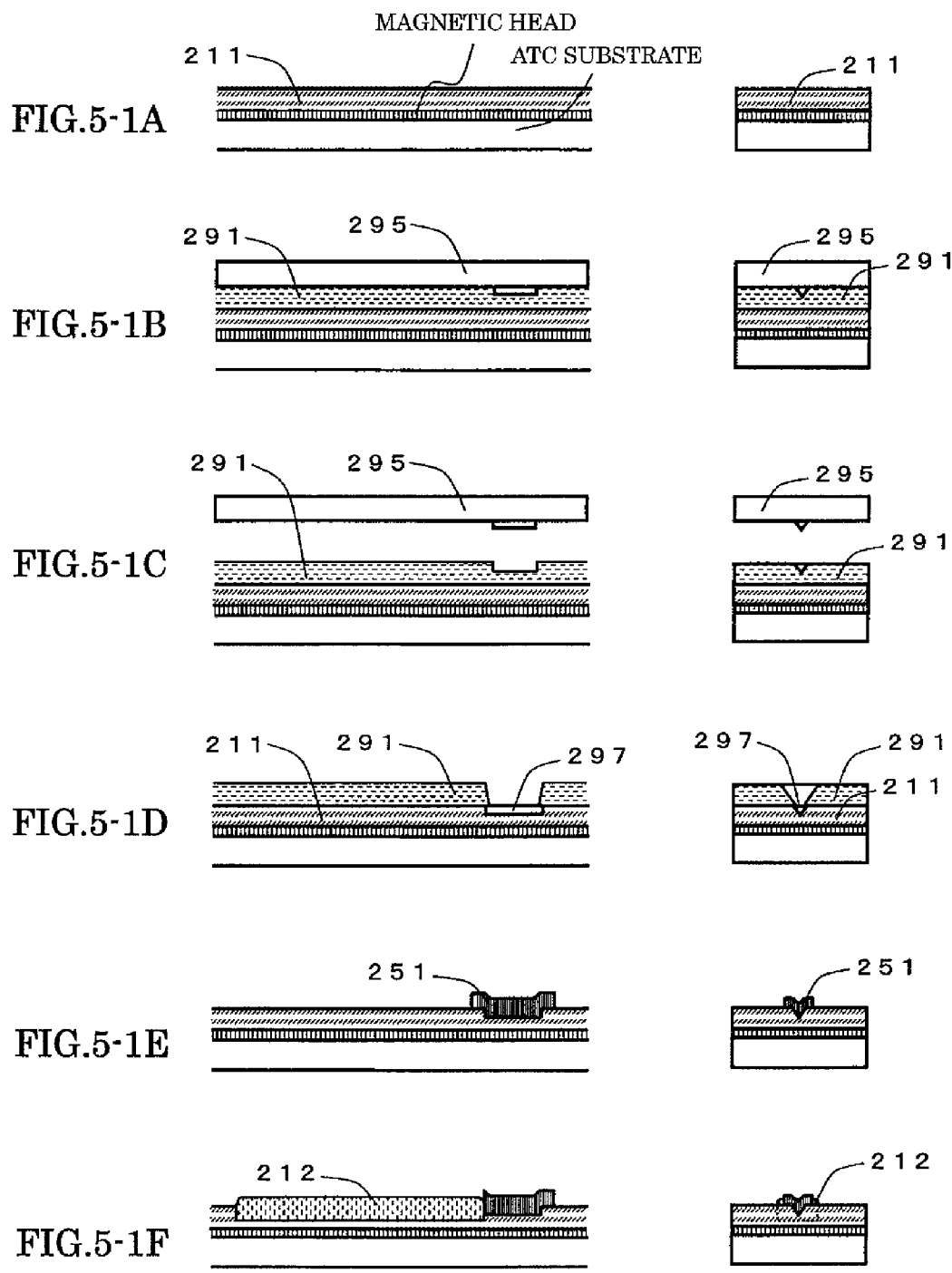

FIG.5-2G  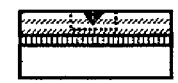
FIG.5-2H 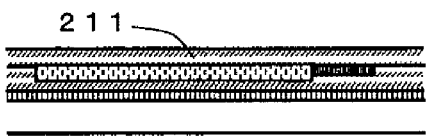 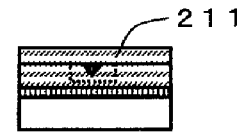
FIG.5-2I  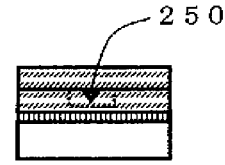

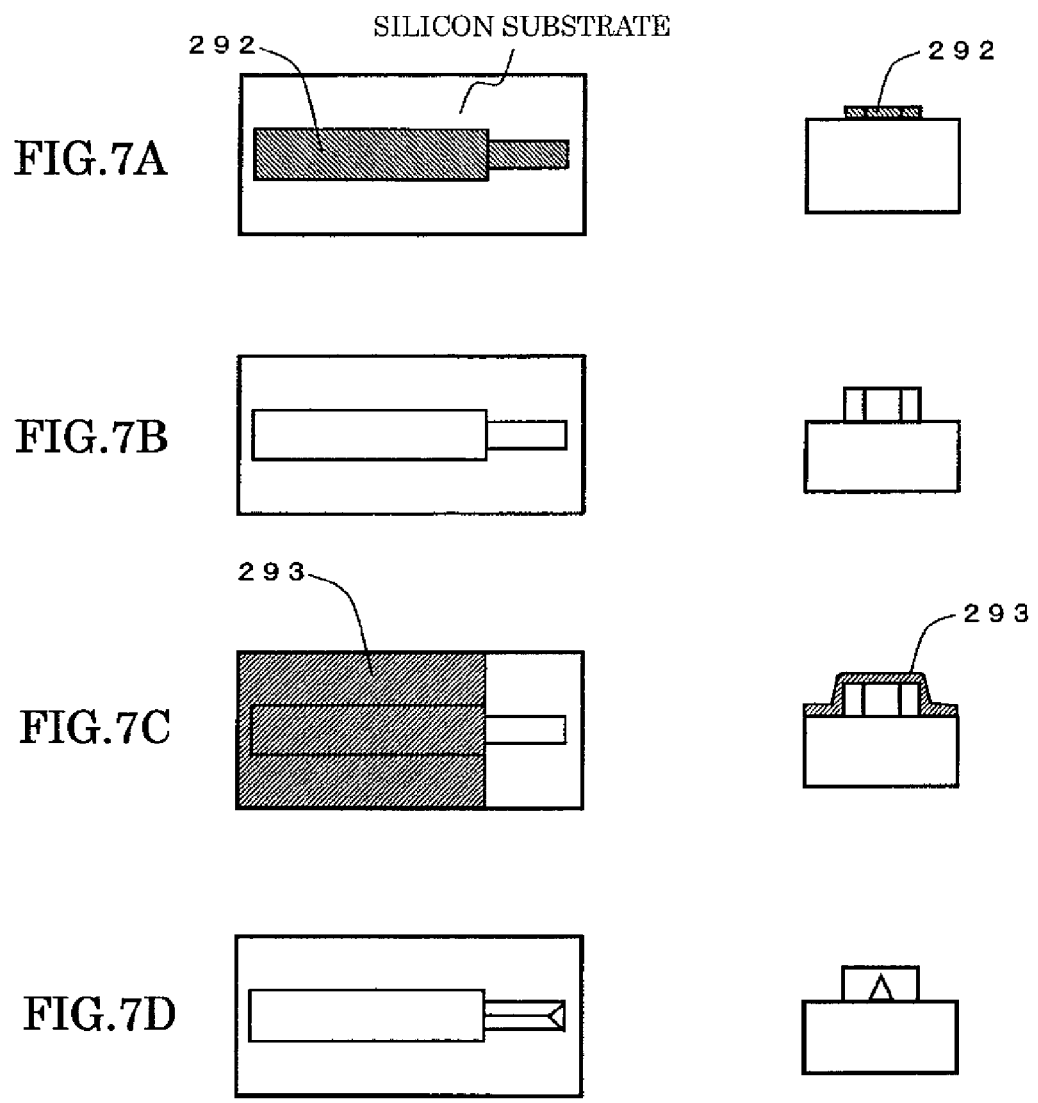

METHOD OF MANUFACTURING NEAR-FIELD LIGHT GENERATING ELEMENT AND NEAR-FIELD LIGHT GENERATING ELEMENT

BACKGROUND OF THE INVENTION

1. Field of the Invention

The present invention relates to a method of manufacturing a near-field light generating element that is mounted on a recording head that records a variety of information on a recording medium, using light, particularly, near-field light, and a near-field light generating element.

2. Background Art

Recently, the information recording/reproducing device in information processing equipment is exposed to demands for size reductions in of the device itself and recording and reproducing larger amounts of information. Therefore, the media where information is recorded, such as the magnetic medium of a hard disk drive, improve in record density every year. In order to cope with the increase in record density, it is necessary to reduce the size of a magnetic domain that is one recording unit (small magnet mounted on a recording medium) and make the domains closer together, but as the size is reduced, a phenomenon where the recorded magnetic domain is unintentionally reversed due to the influence of adjacent magnetic domains, heat energy around the magnetic domains, or the like occurs. Materials with strong retention ability are employed for the recording medium to suppress this phenomenon. Although a recording medium with strong retention ability suppresses the unintentional reversal phenomenon, a magnetic domain cannot be reversed and recording becomes difficult unless a larger magnetic field is applied during recording.

A method of performing rewriting by radiating light to heat only the magnetic domain to be recorded such that temperature is increased and the coercive force is reduced, in order to remove the defect has been proposed. Since the size of the magnetic domain itself for recording is greatly reduced due to a yearly increase in record density, it is necessary to concentrate light, for heating, in a size equal to or less than the wavelength of light, which has been considered as a limit in the optical systems in the related art. In order to realize this, it is possible to concentrate light onto a smaller area to heat the area by using near-field light, such that it is possible to achieve a high record density which exceeds the information recording/reproducing devices of the related art.

A head that records information, using the light assist magnetic recording method, requires an element generating high-intensity near-field light and a magnetic head disposed very close to the element and rewriting the information on a medium. The element generating high-intensity near-field light is particularly important. Various configurations have been proposed for the near-field light generating element. Those in JP-A-2007-280572 and JP-A-2007-128573 may be exemplified. A second light waveguide medium (cladding) is disposed in contact with a first light waveguide medium (core) and provided with a refraction index smaller than the first light waveguide medium. A fine flat and triangular scattering body (near-field light generating element) is disposed such that light is radiated through the first light waveguide medium. Since the near-field light generating element having this structure can directly radiate light to the scattering body from the core without using a lens or the like, high polarization is not generated in the core. Since large polarization is not generated, it is possible to generate high-intensity near-field light without losing the effect of the electric charges collected on the surface of the scattering body.

The near-field light generating element is implemented in a submicroscopic structure with a core having a cross-section with one side of hundreds of nanometers and a scattering body having one side of a hundred and several tens of nanometers and a thickness of tens of nanometers. Therefore, the scattering body that generates near-field light requires high dimensional accuracy, at least about several to 10 nanometers. Further, it is described in JP-A-2007-280572 and JP-A-2007-128573 that the intensity of the generated near-field light is greatly changed by the relative positions of the core, cladding, and scattering body. However, JP-A-2007-280572 and JP-A-2007-128573 do not disclose a manufacturing method that implements the positional and dimensional accuracy of about several to tens of nanometers.

SUMMARY OF THE INVENTION

Therefore, the present invention has been made in consideration of these conditions and it is an object to provide a manufacturing method of a near-field light generating element which can achieve high accuracy in the relative position of a core, a cladding, and a scattering body and the dimensions of the scattering body, and a near-field light generating element that is manufactured by the method.

The present invention provides the following means to achieve the object.

A method of manufacturing a near-field light generating element according to the present invention includes: a cladding forming process that forms a cladding onto a substrate; a first groove forming process that forms a first groove on the cladding; a second groove forming process that forms a second groove in the longitudinal direction of the first groove on the cladding; a metal structure forming process that forms a metal structure inside the first groove; a core forming process that disposes a core made of a material having a larger refraction index than the cladding, inside the second groove; and a scattering body forming process that forms a scattering body by cutting the metal structure to be perpendicular to the substrate plane and polishing the cut surface.

According to this aspect, it is possible to adjust the positional relationship of the scattering body generating near-field light and the optical axis of the optical waveguide (core and cladding) providing light to the scattering body, into a desired positional relationship. Therefore, it is possible to more efficiently generate near-field light. Further, since it is possible to polish the scattering body embedded in the cladding or the core when forming the scattering body by polishing, it is possible to form the scattering body without breaking. Further, since it is possible to use a vacuum thin film manufacturing technology, it is possible to collectively manufacture a plurality of elements and implement the method of manufacturing a near-field light generating element in large quantities at a low cost.

Further, according to the method of manufacturing a near-field light generating element of the present invention, the first groove is formed by pressure-welding a first pattern, which corresponds to the first groove, onto the cladding, in the first groove forming process.

Further, the method of manufacturing a near-field light generating element of the present invention further includes a resist forming process that forms a resist at least on the cladding after the cladding forming process, in which, in the process of forming the first groove, a groove shaped substantially the same as the first groove is formed on the resistor by pressure-welding the first pattern, which corresponds to the first groove, onto the resist, and the first groove is formed on the cladding by etching the groove shaped substantially the same as the first groove.

Further, according to the method of manufacturing a near-field light generating element of the present invention, the first groove forming process forms the first groove with a dicing blade.

Further, according to the method of manufacturing a near-field light generating element of the present invention, the second groove is formed by pressure-welding a second pattern, which corresponds to the second groove, onto the cladding, in the second groove forming process.

According to this aspect, it is possible to collectively form the grooves with high accuracy and form the core and the scattering body inside the grooves with high accuracy. Therefore, it is possible to generate near-field light with high efficiency and it is possible to manufacture the near-field light generating elements in large quantities.

Further, the method of manufacturing a near-field light generating element of the present invention further includes: a planarizing process that planarizes the core; and a process of forming an over-cladding onto the planarized core, after the core forming process.

According to this aspect, since it is possible to effectively cover the core with the cladding and prevent dispersion of light traveling through the core, the light transmission efficiency increases and it is possible to generate high-intensity near-field light.

Further, according to the method of manufacturing a near-field light generating element of the present invention, an electric resistor is disposed into the metal structure, and the cut surface of the metal structure is polished in accordance with the resistance value of the electric resistor which is changed by applying electricity to the electric resistor, in the scattering body forming process.

According to this aspect, it is possible to control the polishing amount with high accuracy without visually controlling the polishing amount, such that it is possible to form the scattering body with high dimensional accuracy. Therefore, it is possible to generate near-field light with high efficiency.

Further, the present invention provides a near-field light generating, element manufactured by the manufacturing method described above.

Since it is possible to adjust the positional relationship of the scattering body generating near-field light and the optical axis of the optical waveguide media, into a desired positional relationship, it is possible to efficiently generate near-field light.

BRIEF DESCRIPTION OF THE DRAWINGS

FIG. 5-1A to 5-1F are illustrative views showing the method of manufacturing the near-field light generating element according to the first embodiment of the present invention.

FIG. 5-2G to 5-2I are illustrative views showing the method of manufacturing the near-field light generating element according to the first embodiment of the present invention, which continues from FIGS. 5-1A to 5-1F.

FIGS. 7A to 7D are illustrative views showing a method of manufacturing a pattern substrate, using the method of manufacturing a near-field light generating element according to the second embodiment of the present invention.

DETAILED DESCRIPTION OF THE INVENTION

First Embodiment

Figure 1:
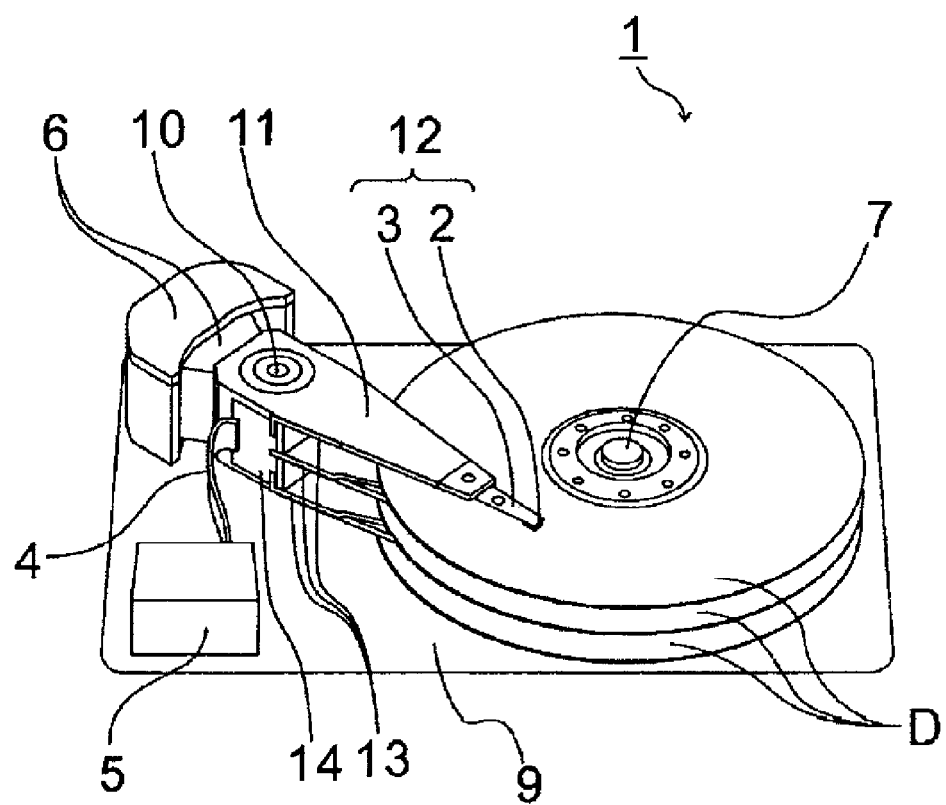
FIG. 1 is a configuration view showing an information recording/reproducing device using a head gimbal assembly manufactured by a method of manufacturing a near-field light generating element according to a first embodiment of the present invention.

Hereinafter, a first embodiment of the present invention is described with reference to FIG. 1 to FIGS. 5-2I. FIG. 1 is a configuration view showing an information recording/reproducing device 1 using a head gimbal assembly manufactured by a method of manufacturing a near-field light generating element according to the present invention. An information recording/reproducing device 1 is a device that performs writing on a recording medium D having a magnetic record film, using thermal assist magnetic recording.

In the information recording/reproducing device 1 shown in FIG. 1, a suspension 3 where a slider 2 is fixed is fixed to a carriage 11. The combination of the slider 2 and the suspension 3 is called a head gimbal assembly 12. The recording medium D, which is a disk, is turned in a predetermined direction by a spindle motor 7. The carriage 11 can turn about a pivot 10 and can place a slider 2 at a predetermined position on the surface of the recording medium D while being turned by an actuator 6 controlled by control signals from a control unit 5. A housing 9 is made of aluminum or the like in a box shape (the walls surrounding the housing 9 are not shown in FIG. 1 for ease of illustration) and accommodates the components therein. The spindle motor 7 is fixed to the bottom of the housing 9. The slider 2 includes a magnetic pole (not shown) generating a magnetic field toward the recording medium D, a near-field light generating element (not shown) generating a near-field light spot, and a magnetic head (not shown) reproducing information recorded on the recording medium D. The magnetic pole and the magnetic head are connected to the control unit 5 through a flexible substrate 13 disposed along the suspension 3 and the carriage 11, and a terminal 14 and a flat cable 4 disposed at a side of the carriage 11. The control unit 5 includes an electronic circuit and a light source connected to the electronic circuit. The electronic circuit of the control unit 5 and an electric wire in the flexible substrate 13 are electrically connected and the light source and a light waveguide in the flexible substrate 13 are optically connected.

One sheet of recording medium D may be possible and, as shown in FIG. 1, a plurality of recording media may be possible. The larger the number of the recording media D, the greater the number of the head gimbal assembly 12. Although the head gimbal assembly 12 is disposed on only one side of the recording medium D in FIG. 1, it may be disposed on both sides. Therefore, the number of the head gimbal assembly 12 is at the maximum double the number of recording media D. Accordingly, it is possible to increase the recording capacity of the information recording/reproducing device and reduce the size of the device.

Figure 2:
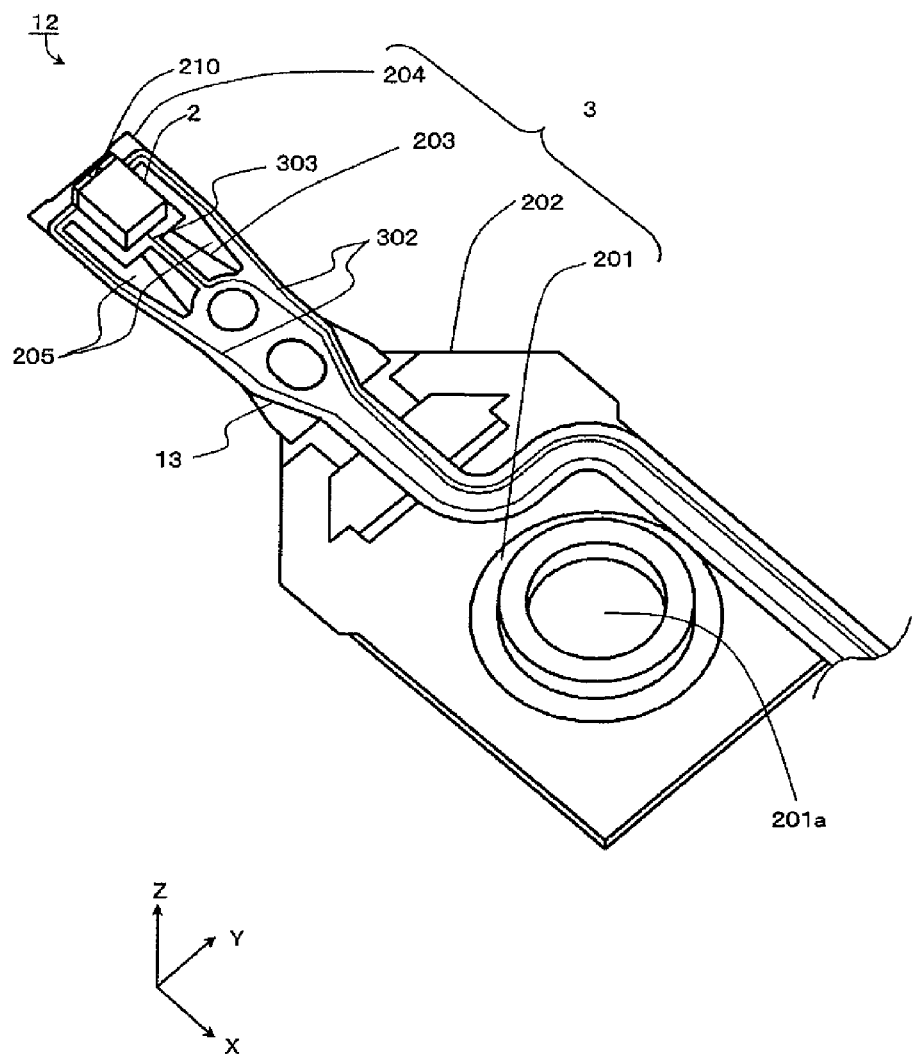
FIG. 2 is a configuration view showing a head gimbal assembly manufactured by the method of manufacturing a near-field light generating element according to the first embodiment of the present invention.

FIG. 2 is an enlarged view of the head gimbal assembly 12 manufactured by the method of manufacturing a near-field light generating element according to the present invention. The suspension 3 is formed of a thin stainless steel plate and composed of a base plate 201, a hinge 202, a rod beam 203, and a flexure 204. The base plate 201 is fixed to the carriage 11 by a mounting hole 201a formed at a portion thereof. The hinge 202 connects the base plate 201 with the rod beam 203. The hinge 202 is thinner than the base plate 201 and the rod beam 203 and the suspension 3 bends with the hinge 202 as the center. The flexure 204 is a long and thin member fixed to the rod beam 203 and the hinge 202, which is thinner than the rod beam 203 or the base plate 201 and has a U-shaped opening 205, such that it can easily bend. The flexible substrate 13 made of resin in a thin plate shape is disposed on the surface opposite to the surface of the flexure 204 where the rod beam 203 is disposed. The slider 2 having a substantially rectangular shape is fixed to the front end of the flexure 204, through the flexible substrate 13.

Figure 3:
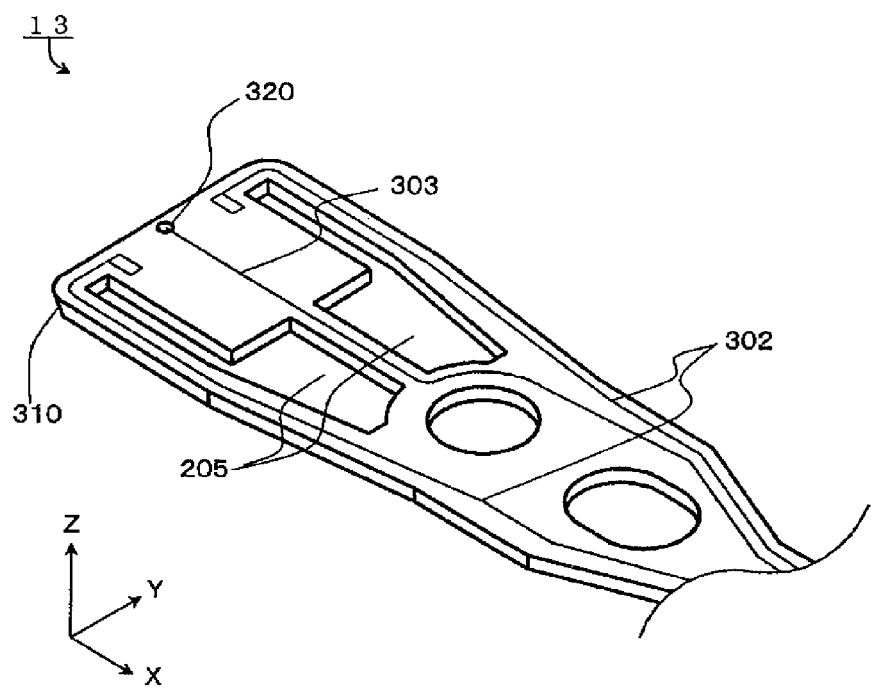
FIG. 3 is an illustrative view illustrating the structure of a flexible substrate of the head gimbal assembly manufactured by the method of manufacturing a near-field light generating element according to the first embodiment of the present invention.

FIG. 3 is an illustrative view illustrating the configuration of the flexible substrate 13.

An electric wire 302 and a core 303 of a light waveguide are disposed in the flexible substrate 13 made of resin on a thin plate. The core 303 of the light waveguide is disposed across the opening 205 of the flexure 204. An inclined surface 310 with an angle of about 45 degrees is disposed at one end surface of the core 303 which is close to the slider 2 and a reflective film (not shown) which is a thin metal film is disposed on the inclined surface 310. Light transmitted through the core 303 of the light waveguide from the other end to the inclined surface 310 reflects from the reflective film of the inclined surface 310, and is discharged to the surface fixed with the slider 2 (the X-Y surface at the positive Z-axial side in FIG. 3). The area through which light is emitted, in the surface of the flexible substrate 13, is called a flexible substrate side light-emitting end 320.

Figure 4:
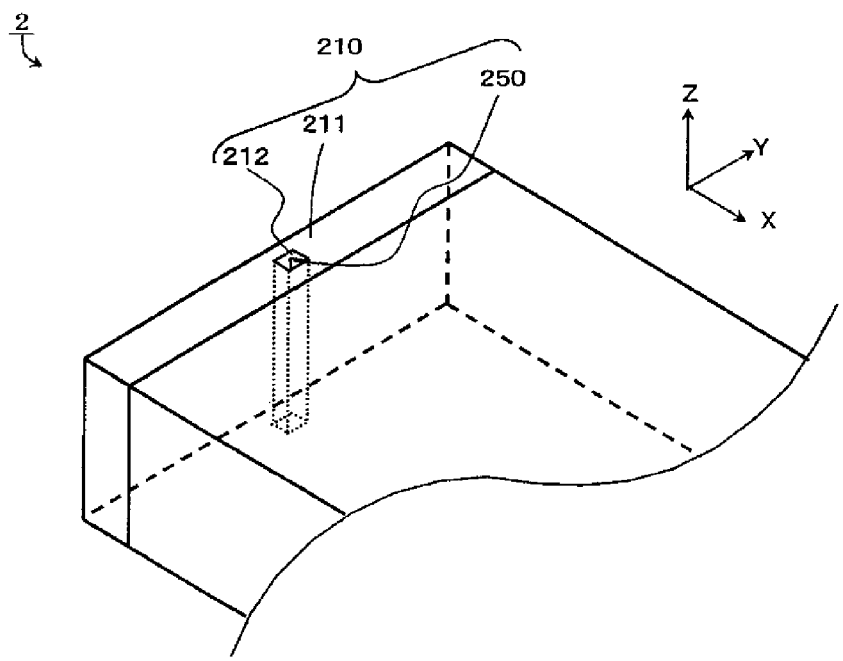
FIG. 4 is an illustrative view illustrating the structure of a slider of the head gimbal assembly manufactured by the method of manufacturing a near-field light generating element according to the first embodiment of the present invention.

FIG. 4 is an illustrative view illustrating the structure of the slider 2.

The X-Y surface at the positive Z-axial side of the slider 2 is a surface opposite to the recording medium D (FIG. 1). The surface is called an ABS (Air Bearing Surface) and has a fine concave-convexo shape (not shown).

In this configuration, when the recording medium D is turned, a desired pressure for lifting the slider 2 is generated from viscosity of air flow generated between the ABS of the slider 2 and the recording medium D. The slider 2 is lifted in a desired state by the balance of the positive pressure moving the slider 2 away from the recording medium D, the negative pressure attracting the slider 2 to the recording medium D, and a traction force by the suspension 3. The minimum of the gap between the recording medium D and the slider 2 is about 10 nm or less. The traction force by the suspension 3 is mainly generated by elasticity of the hinge 202. Further, the slider 2 can keep in the desired lifted state by elastic deformation of the hinge 202 and the flexure 204, with respect to waves on the surface of the recording medium D.

Further, the near-field light generating element 210, a magnetic pole, and a magnetic head (not shown) are disposed close to each other, on the X-Y surface at the positive Z-axial side, and at the negative X-axial side end of the slider 2. The near-field light generating element 210 is composed of a waveguide core 212 disposed substantially in parallel with the X axis, a scattering body 250 having a triangular plate shape and disposed at positive Z-axial side end of the waveguide core 212, and a cladding 211 disposed around the waveguide core 212. The scattering body 250 is a triangle with one side of about 100 nm.

The electric wire 302 disposed in the flexible substrate 13 is electrically connected with the slider 2. In detail, the electric wire is connected to a coil of the magnetic pole and the magnetic head through a wire in the slider. The magnetic pole generates a magnetic field by the current flowing through the coil and the magnetic head outputs the magnetic field generated from a magnetic domain recorded on the recording medium, as electric output.

Further, the flexible substrate 13 and the slider 2 are optically connected. Light radiated from a semiconductor laser that is a light source is transmitted to the core 303 disposed in the flexible substrate 13, reflects from the inclined surface 310, and then travels into an incident end of the near-field light generating element 210 disposed at the slider 2. The light traveling into the incident end of the near-field light generating element 210 is transmitted into the waveguide core 212 disposed in the near-field light generating element 210, to the positive Z-axial side. The scattering body 250 having a triangular plate shape is disposed at the end surface at the positive Z-axial side of the waveguide core 212, in which the light transmitted in the waveguide core 212 is converted into near-field light.

Since the electric wire 302 and the core 303 of the flexible substrate 13 are electrically and optically connected with the control unit 5, respectively, the electronic circuit of the control unit 5, the semiconductor laser, and the slider 2 are electrically and optically connected.

According to this configuration, it is possible to control the magnetic pole and the magnetic head mounted on the slider 2, using signals from the electronic circuit of the control unit 5. Further, it is possible to heat a desired area of the recording medium D with the near-field light of the near-field light generating element 210 disposed adjacent to the magnetic pole. Therefore, it is possible to record/reproduce the information of the recording medium D.

Next, FIGS. 5-1A to 5-2I show a manufacturing process of a near-field light generating element of the present invention.

First, the cladding 211 is formed by forming a tantalum oxide film onto an ATC substrate where the magnetic head recording/reproducing magnetic information and various structures of the magnetic pole are formed (FIG. 5-1A).

A resist 291 is applied on to the cladding 211 and a pattern substrate 295 with a fine triangular column is pressure-welded onto the resist (FIG. 5-1B). Further, the pattern substrate 295 is made of silicon and the lying triangular column is formed by anisotropic etching. In detail, a triangular cross-section is formed perpendicular to the substrate surface.

The pattern substrate 295 is baked while being pressure-welded on the resist 291, and is then separated. A V-shaped grove that corresponds to the triangular column of the pattern substrate 295 is transcribed and formed on the resist 291 on the cladding 211 (FIG. 5-1C).

Thereafter, when etching of tantalum oxide is performed, the resist layer is gradually dissolved and the resist is removed from the thinnest portion of the V-shaped groove. As the cladding 211 is etched from the removed portion of the resist layer and the V-shaped groove of the resist 291 is transcribed, the V-shaped groove 297 is formed on the cladding 211 (FIG. 5-1D).

The remaining resist 291 is removed, a film of gold 251 is formed, and the V-shaped groove 297 is filled with the gold 251 (FIG. 5-1E).

Applying of resist, exposing, and developing are performed and then a U-shaped groove is formed adjacent to or around the V-shaped groove. Thereafter, a tantalum oxide film having a refraction index higher than the cladding 211 is formed to be filled at least in the U-shaped groove, thereby forming the waveguide core 212 (FIG. 5-1F).

Thereafter, the upper surface of the substrate is planarized by performing chemical polishing on the upper surface of the substrate (FIG. 5-2G).

Further, the tantalum oxide film having a low refraction index formed in FIG. 5-1A is formed thereon to be entirely covered with the cladding 211 (FIG. 5-2H).

Thereafter, the ATC substrate is diced in a bar shape and the dicing-cut surface is polished. In this process, the gold 251 filled in the V-shaped groove is polished with the polishing amount controlled such that the thickness of the gold 251 becomes a predetermined value, thereby forming the scattering body 250 (FIG. 5-2I).

Further, a fine structure for ABS is formed by performing chemical polishing or etching on the polished surface. Further, the slider 2 is implemented by dicing the bar-shaped substrate into an independent piece.

Further, an ELG (electro lapping guide) may be disposed around the V-shaped groove 297 and the polishing amount may be controlled by the ELG in order to polish and form the scattering body 250. The ELG controls the polishing amount by performing the polishing while checking the resistance value of the ELG element. In detail, the V-shaped groove is filled with gold and then the substrate surface is polished. Thereafter, the ELG element and a pair of pads connected to both ends of the ELG element are formed. The cladding is not formed on the pads such that the polishing is performed while electricity is applied to the ELG element through the pads when the scattering body is formed. Therefore, the ELG element is also polished with the side of the bar and the width of the ELG element is reduced, such that electric resistance increases. The polishing is performed while monitoring the resistance value of the ELG element by acquiring in advance the relationship between the electric resistance of the ELG and the polishing amount and it is determined that a desired polishing amount is obtained when the resistance value reaches a predetermined value, whereby the polishing is finished.

Further, although the tantalum oxide is used for the waveguide core 212 herein, as long as a material can be provided with a fine structure by having high transmittance for the light traveling through the waveguide core 212 and a predetermined difference in refraction index for the cladding 211, the material can be used. For example, silicon oxide, tin oxide, zinc oxide, cadmium tin oxide, resin for the light waveguide or the like may be used. Further, similarly, the scattering body may be implemented by using not only gold, but a metallic material generating near-field light, silver, aluminum, copper, platinum, palladium or the like.

Further, although the ATC substrate, the magnetic head structure, and the near-field light generating element are sequentially formed herein, it may be possible to form first the near-field light generating element on the ATC substrate and then form the magnetic head structure recording/reproducing magnetic information. This may be determined from the positional relationship between the near-field light generating element that is a light source and the magnetic head that records/reproduces magnetic information, which effectively interact with each other on the recording medium D.

According to the manufacturing method, it is possible to achieve a predetermined positional relationship and dimensions, for the positional relationship of the waveguide core, the cladding, and the scattering body, and the dimensions of the scattering body. Therefore, it is possible to efficiently convert the light, which travels into the near-field light generating element, into near-field light, such that it is possible to radiate high-intensity near-field light from the near-field light generating element. Accordingly, it is possible to provide a high-performance information recording/reproducing device.

Further, since the near-field light generating elements are collectively formed by a thin film manufacturing apparatus in large quantities and then separated by dicing, it is possible to manufacture the near-field light generating elements in large quantities at a low cost.

Second Embodiment

Hereinafter, a manufacturing method according to a second embodiment of the present invention is described with reference to FIGS. 6A to 6G. The same components as those of the first embodiment are given the same reference numerals and the detailed description is not provided. The second embodiment is different from the first embodiment in that the V-shaped groove and the U-shaped groove are simultaneously formed on the cladding.

Figure 6A:
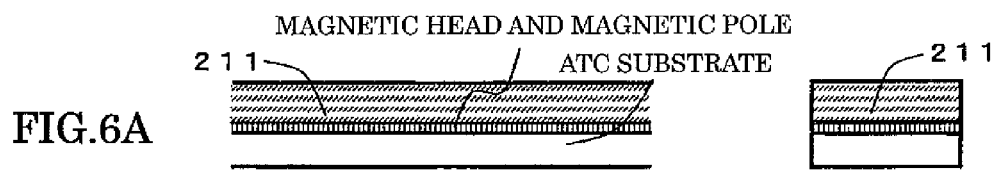
FIGS. 6A to 6G are illustrative views showing the method of manufacturing a near-field light generating element according to a second embodiment of the present invention.

As shown in FIGS. 6A to 6G, PMMA (Poly Methyl Methacrylate Acrylic resin) that becomes a cladding 211 is coated on an ATC substrate where a magnetic head structure, which records/reproduces magnetic information, is formed. (FIG. 6A).

Figure 6B:
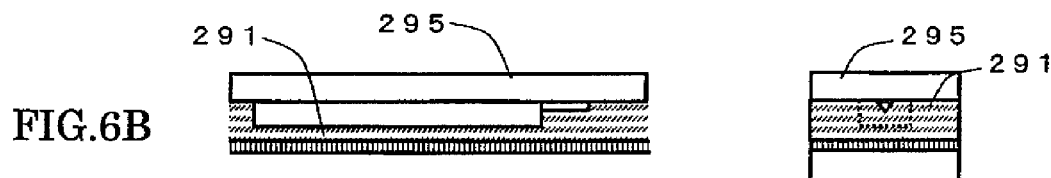

Further, a pattern substrate 295 with a fine triangular column and a rectangular column is pressure-welded onto the PMMA (FIG. 6B). The triangular column of the pattern substrate 295 is laid, in detail, the triangular cross-section is perpendicular to the substrate surface. The rectangular column is disposed adjacent to or around the triangular column.

Figure 6C:
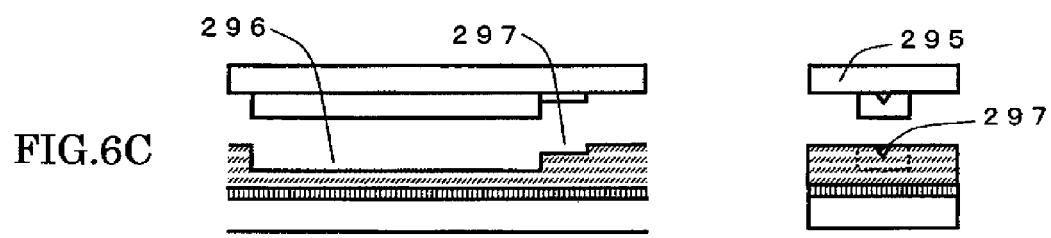

The pattern substrate 295 is baked while being pressure-welded on the cladding 211, and is then separated. A V-shaped groove 297 and a U-shaped groove 296 that correspond to the triangular column and the rectangular column of the pattern substrate 295 are transcribed and formed on the cladding 211 (FIG. 6C).

Figure 6D:
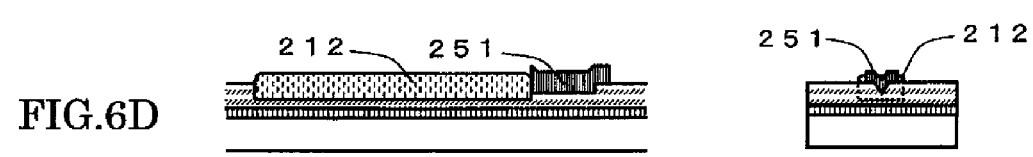

Thereafter, a film of gold 251 is formed and the PMMA having a refraction index higher than the cladding 211 is coated and then baked. The V-shaped groove 297 is filled with the gold 251 and the U-shaped groove 296 is filled with the waveguide core 212 (FIG. 6D).

Figure 6E:

Thereafter, chemical polishing is performed on the upper surface of the substrate and the surface of the upper substrate is planarized (FIG. 6E).

Figure 6F:
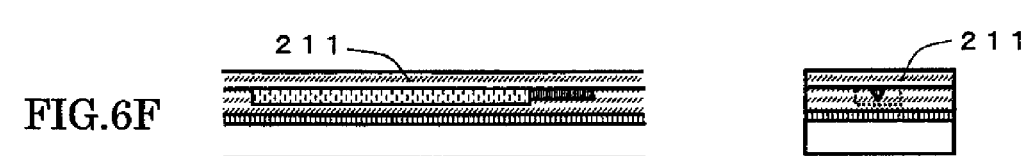

Further, the PMMA having a low refraction index formed in FIG. 6A is coated and baked to be entirely covered with the cladding 211 (FIG. 6F).

Figure 6G:
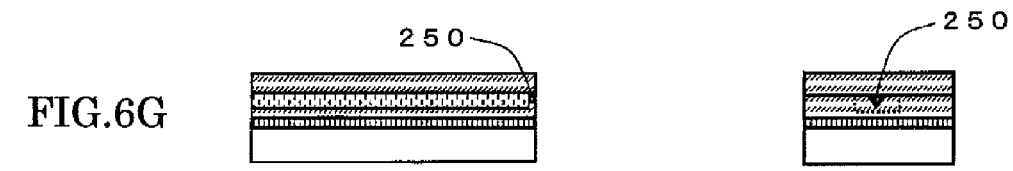

Thereafter, similar to the first embodiment, after the substrate is diced, the gold 251 filled in the V-shaped groove is polished with the polishing amount controlled such that the thickness of the gold 251 becomes a predetermined value, thereby forming a scattering body 250 (FIG. 6G).

The pattern substrate 295 where the V-shaped groove and the U-shaped groove are simultaneously formed was used herein. A method of manufacturing the pattern substrate 295 is described with reference to FIGS. 7A to 7D.

A resist 292 is coated onto the pattern substrate and then exposed and developed into rectangles with different widths (FIG. 7A).

As the resist 292 is removed by dry-etching the pattern substrate, rectangular protrusions with different widths are formed on the surface of the pattern substrate to fit to the shape of the resist 292 (FIG. 7B).

A resist 293 is exposed and developed to cover the protrusion with the larger width and the periphery on the pattern substrate (FIG. 7C).

Thereafter, sputter etching is performed on the pattern substrate in plasma, such as argon (Ar). The corners of the protrusion with the smaller width are selectively etched and inclined surfaces are formed. As the etching continues, the inclined surface is etched with a predetermined angle maintained with respect to the substrate surface, such that a protrusion with a triangular cross-section is formed.

As a result, it is possible to form a pattern substrate with a fine triangular column and a rectangular column disposed close to or adjacent to each other.

Further, although PMMA is used for the materials of the cladding and the waveguide core herein, thermoplastic resin of which the optical refraction index can be adjusted may be used. Further, ultraviolet curable resin may be used by forming the pattern substrate, where grooves are formed, of silicon oxide that transmits ultraviolet rays, and forming the cladding through irradiating with ultraviolet rays rather than baking.

According to this manufacturing method, it is possible to collectively form the grooves, where the waveguide core and the scattering body are formed, with high accuracy, such that the near-field light generating elements can be manufactured in large quantities at a low cost. Since it is possible to use a resin material for the cladding and the waveguide core, it is possible to manufacture the near-field light generating element at a low cost without using a high-performance vacuum thin film manufacturing apparatus.

Third Embodiment

Hereafter, a manufacturing method according to a third embodiment of the present invention is described with reference to FIGS. 8A to 8G. The same components as those of the first and second embodiments are given the same reference numerals and the detailed description is not provided.

This embodiment is different from the first and second embodiments in that the V-shaped groove is formed by dicing the cladding.

Figure 8A:
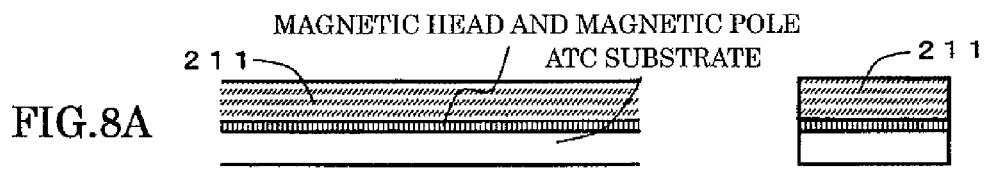
FIGS. 8A to 8G are illustrative views showing the method of manufacturing a near-field light generating element according to a third embodiment of the present invention.

First, the cladding 211 is formed by forming a tantalum oxide film on an ATC substrate where the magnetic head recording/reproducing magnetic information and various structures of the magnetic pole are formed (FIG. 8A).

Figure 8B:
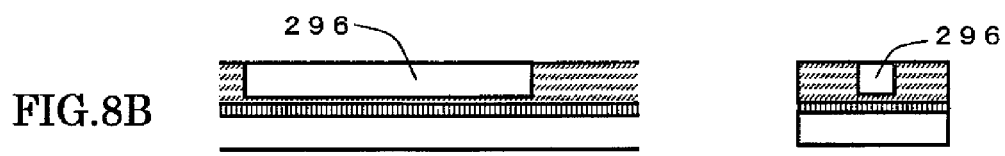

A resist is applied onto the cladding 211 and exposed and developed, and then a U-shaped groove 296 is formed on the cladding 211 by etching the cladding 211 (FIG. 8B).

Figure 8C:
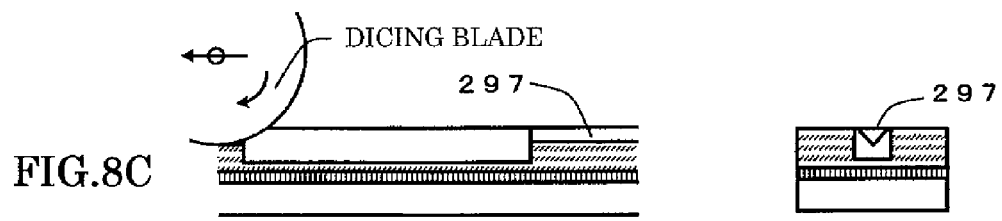

After the resist 291 is removed, a V-shaped groove 297 is formed longitudinally to the U-shaped groove 296 by dicing (FIG. 8C). The dicing blade used herein has the tip with a predetermined acute angle, such that the V-shaped groove is formed on the cladding 291.

Figure 8D:
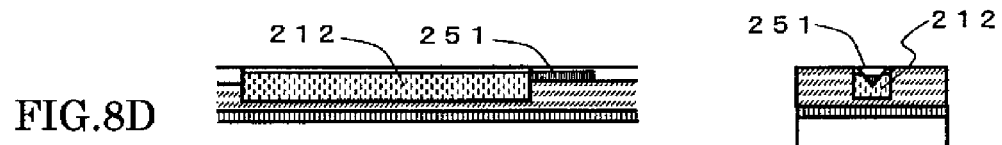
Figure 8E:
Figure 8F:
Figure 8G:
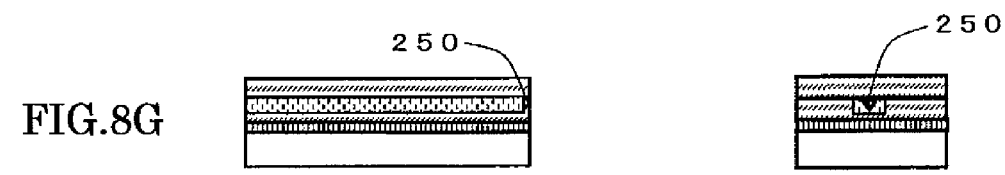

The formed V-shaped groove 297 is filled with gold 251 and the U-shaped groove 296 is filled with a waveguide core 212 (FIG. 8D). Thereafter, the cladding 211 is formed (FIG. 8F) by polishing the substrate surface (FIG. 8E) and the substrate is cut by dicing and the diced surface is polished, thereby forming a scattering body 250 (FIG. 8G).

A dicing blade having the tip with an acute angle was used for dicing in order to form the V-shaped groove. When it is difficult to control the cutting depth at about tens to hundreds of nanometers by dicing, it may be possible to form the V-shaped groove deep and then control the triangular shape of the scattering body 250 with the polishing amount shown in FIG. 8E.

According to this manufacturing method, as it is possible to achieve a predetermined positional relationship and dimensions, for the positional relationship of the waveguide core, the cladding, and the scattering body, and the dimensions of the scattering body, the efficiency of converting light into near-field light increases, such that it is possible to generate high-intensity near-field light from the near-field light generating element. Accordingly, it is possible to provide a high-performance information recording/reproducing device.

Further, since it is possible to introduce a mechanical processing method, it is possible to manufacture the near-field light generating element at a low cost without using a high-performance vacuum thin film manufacturing apparatus.

Further, the scope of the present invention is not limited to the embodiments described above and includes various modifications of the embodiments without departing from the spirit of the present invention. That is, the configurations proposed in the embodiments described above are just examples and may be appropriately changed.

Further, it is possible to employ appropriate combinations of the embodiments described above.

What is claimed is:

1. A method of manufacturing a near-field light generating element, comprising:
    a cladding forming process that forms a cladding onto a substrate;
    a first groove forming process that forms a first groove on the cladding;
    a second groove forming process that forms a second groove in the longitudinal direction of the first groove on the cladding;
    a metal structure forming process that forms a metal structure inside the first groove;
    a core forming process that disposes a core made of a material having a larger refraction index than the cladding, inside the second groove; and
    a scattering body forming process that forms a scattering body by cutting the metal structure to be perpendicular to the substrate plane and polishing the cut surface.

2. The method according to claim 1,
    wherein the first groove is formed by pressure-welding a first pattern, which corresponds to the first groove, onto the cladding, in the first groove forming process.

3. The method according to claim 1, further comprising a resist forming process that forms a resist on the cladding after the cladding forming process,
    wherein a groove shaped substantially the same as the first groove is formed on the resist by pressure-welding the first pattern, which corresponds to the first groove, onto the resist, and
    the first groove is formed on the cladding by etching the groove shaped substantially the same as the first groove, in the first groove forming process.

4. The method according to claim 1,
    wherein the first groove forming process forms the first groove with a dicing blade.

5. The method according to claim 1, wherein the second groove is formed by pressure-welding a second pattern, which corresponds to the second groove, onto the cladding, in the second groove forming process.

6. The method according to claim 1, further comprising:
    a planarizing process that planarizes the core; and
    a process of forming an over-cladding onto the planarized core, after the core forming process.

7. The method according to claim 1, wherein an electric resistor is disposed into the metal structure, and the cut surface of the metal structure is polished in accordance with the resistance value of the electric resistor which is changed by applying electricity to the electric resistor, in the scattering body forming process.

8. A near-field light generating element manufactured by the method of manufacturing a near-field light generating element according to claim 1.

* * * * *